US011214372B2

(12) United States Patent
Bachhuber et al.

(10) Patent No.: US 11,214,372 B2
(45) Date of Patent: Jan. 4, 2022

(54) REPRODUCTION APPLIANCE, REPRODUCTION STRUCTURE, OPERATING METHOD AND USE

(71) Applicant: DIEHL AEROSPACE GMBH, Ueberlingen (DE)

(72) Inventors: Martin Bachhuber, Altdorf (DE); Frank Schmid, Poppenricht (DE)

(73) Assignee: DIEHL AEROSPACE GMBH, Ueberlingen (GB)

( * ) Notice: Subject to any disclaimer, the term of this patent is extended or adjusted under 35 U.S.C. 154(b) by 0 days.

(21) Appl. No.: 16/244,531

(22) Filed: Jan. 10, 2019

(65) Prior Publication Data

US 2019/0217955 A1 Jul. 18, 2019

(30) Foreign Application Priority Data

Jan. 12, 2018 (DE) .......................... 102018000216.1

(51) Int. Cl.
*B60Q 3/47* (2017.01)
*B60Q 3/60* (2017.01)
(Continued)

(52) U.S. Cl.
CPC ............ *B64D 11/0015* (2013.01); *B60Q 3/47* (2017.02); *B60Q 3/60* (2017.02); *B60Q 3/70* (2017.02);
(Continued)

(58) Field of Classification Search
CPC ............ B64D 2011/0038; B64D 11/00; B64D 2203/00; B64D 11/0015; B64D 47/02;
(Continued)

(56) References Cited

U.S. PATENT DOCUMENTS 8,461,505 B2 * 6/2013 Budinger ................. B60Q 3/47
250/208.1
2008/0157997 A1 7/2008 Bleacher et al.
(Continued)

FOREIGN PATENT DOCUMENTS

DE 102009008084 A1 9/2010
DE 102009045462 A1 4/2011
DE 102015004888 B4 * 11/2016 ............. H05B 45/20
EP 2921773 A1 9/2015

*Primary Examiner* — Borna Alaeddini
(74) *Attorney, Agent, or Firm* — Scully Scott Murphy and Presser

(57) ABSTRACT

Disclosed is a reproduction appliance for a passenger cabin of an aircraft, for reproducing visual contents in the passenger cabin with a lighting device having luminaires, a control unit and a control line, wherein the control unit contains an instruction set of light instructions for actuating the luminaires, contains a memory for the contents to be reproduced, an interface to the control line and a decoder for receiving the light instructions having an association rule for associating control instructions for the reproduction appliance with the light instructions. A reproduction structure for the passenger cabin for reproducing the contents contains the reproduction unit and the lighting device. Also disclosed is a method for operating the reproduction appliance involves the contents being stored in the memory in a storage period and the reproduction appliance being controlled by means of light instructions in an operating period.

13 Claims, 1 Drawing Sheet

(51) Int. Cl.
*B64D 11/00* (2006.01)
*H04N 9/31* (2006.01)
*B60Q 3/70* (2017.01)

(52) U.S. Cl.
CPC ............. *H04N 9/31* (2013.01); *H04N 9/3147* (2013.01); *H04N 9/3179* (2013.01)

(58) Field of Classification Search
CPC .......... B64D 11/00153; B64D 11/0023; B64D 11/003; B64D 2045/007; B64D 13/00; B64D 2011/0053; B64D 2221/00; B60Q 3/70; B60Q 3/47; B60Q 3/60; H04N 9/31; H04N 9/3147; H04N 9/3179
See application file for complete search history.

(56) References Cited

U.S. PATENT DOCUMENTS

| | | | |
|---|---|---|---|
| 2009/0021955 A1* | 1/2009 | Kuang | H05B 45/10 |
| | | | 362/479 |
| 2010/0201951 A1 | 8/2010 | Budinger et al. | |
| 2012/0019164 A1* | 1/2012 | Gambeski | H05B 45/20 |
| | | | 315/294 |
| 2012/0254923 A1 | 10/2012 | Riedel et al. | |
| 2016/0262223 A1* | 9/2016 | Schevardo | H05B 47/175 |
| 2016/0264243 A1* | 9/2016 | Madhav | G03B 31/00 |
| 2017/0050560 A1* | 2/2017 | Kuang | H05B 45/12 |
| 2017/0113801 A1* | 4/2017 | Brunaux | B64D 11/00 |
| 2017/0134786 A1* | 5/2017 | Dame | B64D 11/0015 |
| 2017/0253336 A1* | 9/2017 | Matsui | H05B 45/24 |
| 2018/0081615 A1* | 3/2018 | Riedel | B64D 11/0015 |
| 2019/0124369 A1* | 4/2019 | Ludtke | H04L 12/10 |

* cited by examiner

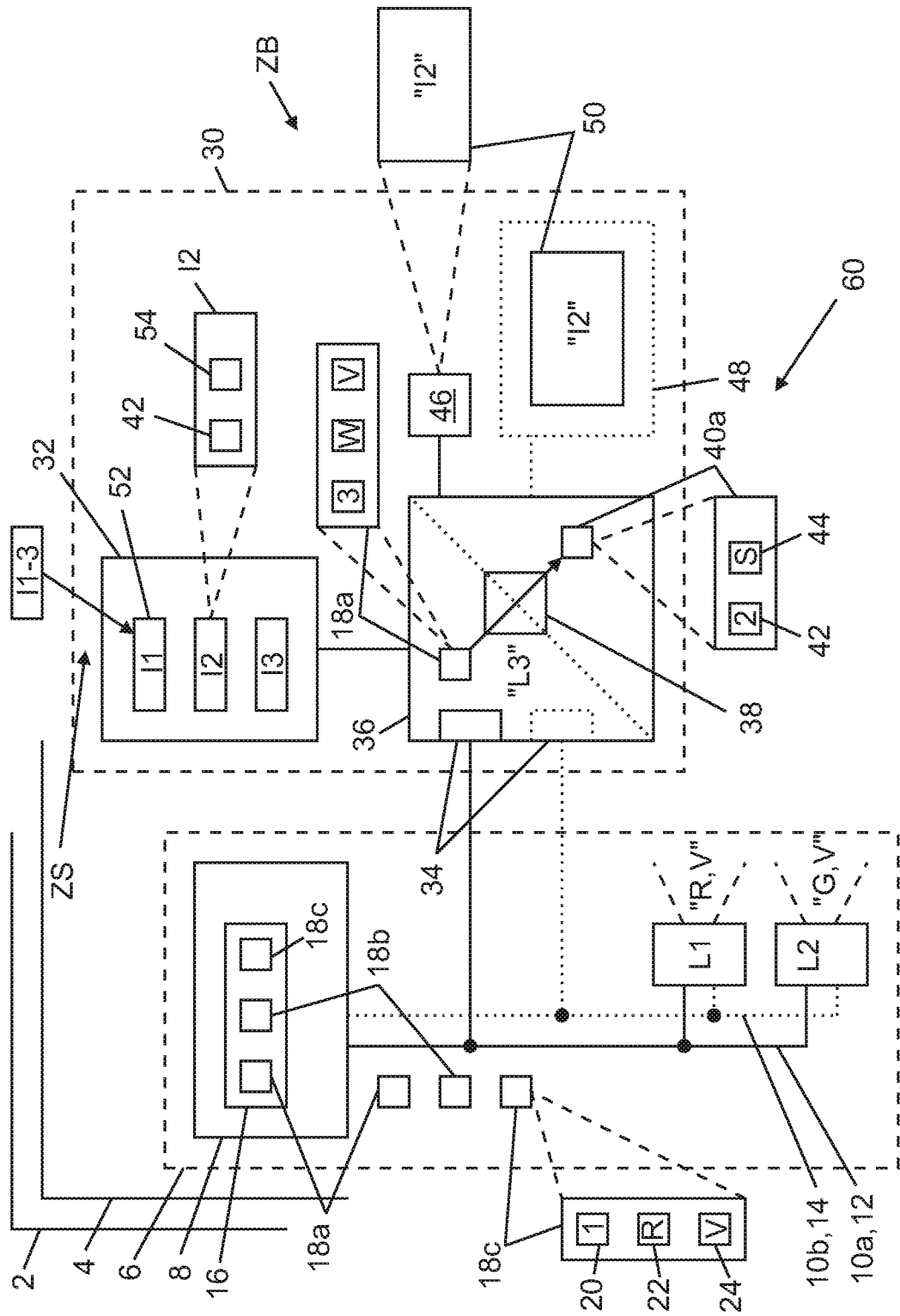

REPRODUCTION APPLIANCE, REPRODUCTION STRUCTURE, OPERATING METHOD AND USE

BACKGROUND OF THE INVENTION

The invention relates to a reproduction appliance for a passenger cabin of an aircraft, wherein the reproduction appliance is used for reproducing visual contents in the passenger cabin, to a corresponding reproduction structure, a method for operating the reproduction appliance and use of a lighting device for a passenger cabin.

DISCUSSION OF THE PRIOR ART

In passenger cabins of aircraft, there is an increasing demand to present visual contents, for example pictures or films, on cabin surfaces in the aircraft cabin.

SUMMARY OF THE INVENTION

The present invention if directed to a reproduction appliance for a passenger cabin of an aircraft. The reproduction appliance is used for reproducing visual contents in the passenger cabin. In this case, the invention is based on the basic condition that the passenger cabin has a lighting device. The lighting device has a plurality of luminaires, a control unit for the luminaires and a control line. The control line connects the luminaires to the control unit. The control unit contains an instruction set of light instructions. The light instructions are used for actuating the luminaires.

The reproduction appliance contains a memory for the contents to be reproduced and an interface for connection to the control line and a decoder for receiving light instructions via the interface. The decoder contains an association rule. The association rule associates a control instruction for the reproduction appliance with at least one of the light instructions.

In this specification, the "passenger cabin" refers to all of the areas of the aircraft that are used by passengers, for example seating areas, washrooms, corridors, bars, boarding and alighting areas, etc. The term "control line" is intended to be understood in this specification to mean a single or multiple lines or line sections or parts that are together used to actuate the luminaires. In particular, multiple line sections are combined to form a line system or network. The light instructions are generated during operation of the control unit, put onto the control line and thus transferred to the luminaires and the reproduction appliance or via the interface to the decoder.

The light instructions are used to instruct the luminaires to deliver light having a particular light characteristic (brightness, colour, on, off, etc.) during operation. In this case, the luminaire converts the light instruction into an applicable light characteristic by means of internal decoding. During operation, the luminaires are thus actuated by means of transfer of a control instruction from the control unit via the control line to the luminaire. "Visual contents" are intended to be understood to mean contents with or without other supplementary contents (e.g. audio content).

According to the invention, not only the luminaires but also the reproduction appliance receives light instructions via the interface. Using the decoder or the association rule, it converts the light instructions into control instructions for itself. Ultimately, the reproduction appliance is thus controlled by "misappropriated" light instructions. A separate actuating infrastructure, including a controller, for actuating the reproduction appliance is therefore dispensed with. The applicable functionality is dealt with at the same time synergistically by means of a dual functionality of the control unit and the control line of the lighting device. There are diverse conventionally known options conceivable for the association of light instructions with luminaires or with the reproduction appliance: merely by way of example, it is possible to mention using such light instructions for controlling the reproduction appliance as are not used by the luminaires, i.e. for example are hitherto "unoccupied". Control instructions for luminaires can be ignored by the reproduction appliance as it were. There is also e.g. different address allocation conceivable for luminaires and reproduction appliances, in which case the light instructions are provided with applicable addresses.

Since the contents to be presented are already stored inside the reproduction appliance in the memory, they do not need to be transferred to the reproduction appliance at the time of reproduction. Only the control instructions need to be transferred, for example in the form "Start reproduction from film 3". Therefore, a comparatively narrowband control line to the reproduction appliance is sufficient, and a comparatively broadband control line for transferring the contents to be presented can be dispensed with. In other words, it is possible to economize on a high-performance communication network in the aircraft cabin.

According to the invention, playback of media contents (contents) is obtained when trigged by light commands (light instructions). When triggered by the light instructions, a reproduction appliance (e.g. projection system or projector) in the aircraft cabin can thus in particular start, stop or pause media contents. According to the invention, stored media contents are in particular started, stopped or paused by means of the use of commands (light instructions) for the lighting system (lighting device).

The reproduction appliance according to the invention can be retrofitted in particular as part of a retrofit in an aircraft with an existing light infrastructure in the form of a lighting device. The reproduction appliance merely needs to have its interface connected to the control line. In this instance, the control unit normally requires only minimal—for example as a result of the introduction of further light instructions—change or expansion. This is normally possible by means of purely software-oriented reprogramming of the control unit. In particular, additional light instructions are added to the instruction set in the control unit, these being associated for the purpose of actuating the additionally added "simulated luminaire" in the form of the reproduction appliance. The decoder coordinates the added light instructions and accordingly needed control instructions with one another.

From the point of view of the lighting device, the reproduction appliance is thus a further "luminaire" or simulates one. Merely the abstract meaning of the light instruction sent to this simulated luminaire changes and is then no longer the production of light having a particular characteristic, but rather the fundamentally different actuation of the reproduction appliance.

In a preferred embodiment, the reproduction appliance contains a projector and/or a display for reproducing the contents. Such reproduction means are particularly suitable for use in aircraft and passenger cabins.

In a preferred embodiment, at least one of the contents contains a picture and/or a film. In this context, an "picture" is intended to be understood to mean all conceivable types of graphical or pictorial representation, for example photographs, sketches, advice, writing, symbols, what are known as standard "signs" in aircraft, etc. "Film" is intended to be understood to mean any type of moving picture such as e.g. feature films, cartoons, video clips, animations, advice videos for passengers, etc. The presentation of applicable contents in the aircraft is used inter alia to increase the comfort of passengers, to improve the safety instruction thereof, etc.

In a preferred embodiment of the invention, at least one of the control instructions relates to the selection and/or reproduction of at least one of the contents. The control instructions can in this case provide instruction to show, hide, overlay or present more brightly or more darkly the or a particular selected content, for example. In this case, sufficient control instructions can be made available to allow complete control of the reproduction appliance.

In a preferred variant of this embodiment, the control instruction is an on (switch on reproduction appliance), off (switch off reproduction appliance), start (reproduce content), stop (terminate reproduction of the content), pause (pause reproduction of the content) or content selection instruction (instruction needs to be applied to the designated content). In this case, combinations of applicable subinstructions within a control instruction are also possible, for example "Start content 3" in order to simultaneously select content 3 and start reproduction thereof.

In a preferred embodiment of the invention, each of the contents has an associated unique identifier. At least one of the light instructions has an associated one of the identifiers as at least part of the control instruction on the basis of the association rule. This further improves the addressing of particular media contents, since, for example, only a number now needs to be transmitted as an identifier of the media content in order to address the latter. The communication connection via the control line can therefore turn out to be even more narrowband. The association rule is used in particular to associate both the identifier and the actual control instruction for the content, for example a single light instruction has the identifier for the content "2" and the control instruction "pause" associated with it, so that the reproduction appliance pauses reproduction of content 2.

The present invention is also directed to a reproduction structure for the passenger cabin of an aircraft explained above. The reproduction structure is also used for reproducing visual contents in the passenger cabin as explained above. The reproduction structure contains a reproduction unit according to the invention and the lighting device for the passenger cabin explained above.

The reproduction structure and at least some of the embodiments thereof and also the respective advantages have already been explained mutatis mutandis in connection with the reproduction appliance according to the invention.

The luminaires are in particular full colour luminaires. The light instructions are sent cyclically, in particular every 200-400 ms, from the control unit to all luminaires and, according to the invention, hence also to the reproduction appliance.

In a preferred embodiment, the light instruction is a bus command or a discrete switching state. In the case of a bus command, the control line is embodied as a bus system, this being consistent in particular with a standard light infrastructure in a newer aircraft. In particular in older aircraft, conventional control lines can still be found that assume discrete switching states (on/off). The invention is therefore in particular suitable for retrofitting in most older and newer aircraft.

In a preferred embodiment, the light instruction contains instructions for a brightness (e.g. "100%") and/or a colour locus (e.g. "red") for light that is to be produced by the luminaires during operation. The light instruction "100% red" is thus used to produce light in the colour red when the luminaire is at full brightness. The association rule then associates an applicable control instruction with a particular combination of colour locus and brightness, which control instruction has nothing more to do with the original colour/brightness information, e.g. "Start content 2". Light instructions of this kind can also be found in a multiplicity of lighting devices in aircraft, which is why the invention is also particularly suitable for retrofitting in this regard.

In a preferred embodiment of the invention, the light instruction contains an address of a destination (luminaire or reproduction appliance) for the light instruction and the reproduction appliance has a different address from the (actual) luminaires. As such, inherently the same light instructions, such as, for example, "100% red", can lead to red light being delivered at full brightness in the case of a luminaire, but can trigger the start of reproduction of the content with the identifier "1" in the case of the reproduction appliance. In conjunction with the aforementioned embodiments of cyclic sending of light commands, forty-two light commands are thus sent in each cycle, for example, including forty with the addresses of forty luminaires and two with the addresses of two reproduction appliances.

Still further, the present invention is directed to a method for operating a reproduction appliance according to the invention installed in an aircraft as intended. The method involves the contents to be made available for a reproduction being stored in the memory in a storage period, and the reproduction appliance being controlled in an operating period by means of light instructions intended for the reproduction appliance.

The method and at least some of the embodiments thereof and also the respective advantages have already been explained mutatis mutandis in connection with the reproduction appliance according to the invention and the reproduction structure according to the invention.

The storage period and operating period are in particular separate periods. The contents are therefore stored separately from operation of the reproduction appliance. Therefore, the contents are available completely during operation of the reproduction appliance and then only need be retrieved from the memory for reproduction.

In a preferred variant of this embodiment, the storage period is outside a flying period of the aircraft. At least part of the operating period is inside the flying period. In this case, the "flying period" includes the period from the beginning of boarding to the completion of alighting for a flight. Outside the flying period, there are periods of idling or maintenance of the aircraft. In particular, the contents are thus stored in the reproduction appliance during aircraft maintenance and are available in the aircraft for the complete period of at least one subsequent flight.

In a preferred embodiment, the reproduction appliance is operated as part of a reproduction structure according to the invention, wherein the luminaires are controlled in the operating period by means of light instructions intended for the luminaires. Actuation of the luminaires by light instructions and of the reproduction appliance likewise by light instructions is therefore effected with equal ranking beside one or together.

Even further, the present invention is directed to a lighting device for a passenger cabin described above. The lighting device has a plurality of luminaires and a control unit for the luminaires and a control line. The control line connects the luminaires to the control unit. The control unit contains an instruction set of light instructions for actuating the luminaires. During use, a reproduction appliance according to the invention has its interface connected to the control line and is actuated from the control unit via the control line by at least one of the light instructions as a control instruction, in particular for the purpose of reproducing at least one of the stored visual contents.

The lighting device originally intended only for operation of the luminaires is therefore directed to a dual function, namely additional control of the reproduction appliance. Therefore, the synergistic effects already mentioned above are obtained.

The invention is based on the following insights, observations and considerations and also has the embodiments that follow. Some of the embodiments are also called "the invention" in this case to simplify matters. The embodiments in this case can also contain parts or combinations of the aforementioned embodiments or can be consistent therewith and/or can possibly also include hitherto unmentioned embodiments.

The invention is based on the insight that luminaires for cabin lighting in large-area aircraft are controlled by particular commands from the outside; this may be by means of discrete switching states or, in newer embodiments, by a bus system.

Luminaires having full colour capability, that is to say that can change their colour by means of commanding from the outside, receive commands with brightness and colour locus information (e.g. Lu'v', RGB, Lxy, etc.) at short intervals (e.g. 400 ms), in particular. This command is interpreted by the luminaire and converted into currents or PWM signals for installed light sources (e.g. LEDs in red, green, blue, white, etc.). The resulting radiated light then represents the commanded value.

In this manner, it is then also possible to produce complex light scenarios having dynamic timing, such as sunrises, chases, polar lights, etc.

The invention is based on the idea of also installing projectors or displays for future passenger cabins, for the purpose of presenting pictures on cabin surfaces.

A fundamental concept of the invention is the following: in order to dispense with a high performance data bus that continuously transfers picture or film data to the projectors or displays, a projection/display system (reproduction appliance) of this kind can also be designed such that it can be controlled using the bus system present as standard—or discrete switching states—(control line/control unit) that is used for light control.

A projection system (reproduction appliance) of this kind consists of at least one projection module (projector) or display, a memory unit (memory) and a control/playback unit (decoder).

The memory unit stores various contents such as films, pictures, etc. Each of these media contents is linked to a unique identifier (e.g. Content1, Content2, etc.). For each identifier, a specific brightness/colour locus command (or discrete switching state), that is to say a light instruction, is defined (in the instruction set) and logically combined with said identifier. If the bus system is now used to send the brightness/colour locus command (light instruction) for the media content 2, for example, said command is interpreted by the control unit (converted into a control instruction by decoder) and the media content 2 is played back and transferred to the output medium (projector or display).

BRIEF DESCRIPTION OF THE DRAWINGS

Further features, effects and advantages of the invention will emerge from the description of a preferred exemplary embodiment of the invention that follows and from the accompanying FIGURES, in which, in a schematic basic outline:

FIG. 1 shows a detail from a passenger cabin with a lighting device and a reproduction appliance.

DETAILED DESCRIPTION OF THE INVENTION

FIG. 1 symbolically shows a detail from an aircraft 2 containing a passenger cabin 4. The passenger cabin 4 contains a lighting device 6 for the passenger cabin 4. The lighting device 6 contains luminaires L, of which only two luminaires L1, 2 are depicted by way of illustration in the example, in this case full colour LED luminaires, for example. The lighting device 6 moreover contains a control unit 8 and also a control line 10 connecting the luminaires L to the control unit 8. The FIGURE depicts two alternatives for the control line 10: the control line 10a is embodied as a bus system 12. Control lines of this kind can normally be found in newer aircraft 2 and light installations. An alternative control line 10b is embodied as a conventional discrete control line 14, which can normally be found in older aircraft 2.

The control unit 8 contains an instruction set 16 of light instructions 18, of which only three light instructions 18a-c are depicted by way of example in FIG. 1. The light instructions 18 are used to actuate all the luminaires L connected to the control line 10. Each of the light instructions 18 is designed as depicted by way of example for the light instruction 18c: it contains an address 20, which is the serial number of the luminaire L to be addressed, in this case "1", in order to address the luminaire L1. Moreover, it contains a colour locus 22 (applicable value or instruction) for the light to be emitted by the luminaire L1, in this case "R" for red light. Additionally, it contains a brightness 24 (applicable value or instruction), likewise for the light to be emitted, in this case "V" for the full luminous intensity, that is to say 100%. The light instruction 18b differs from the light instruction 18c in that the address 20 in the case of the latter is "2" and the colour locus is "G" for green light, in order to address the luminaire L2.

The passenger cabin 4 additionally contains a reproduction appliance 30 used to reproduce visual contents I in the passenger cabin 4. The reproduction appliance 30 contains a memory 32 in which contents I to be reproduced are storable. In the example, three contents I1-3 are stored. The reproduction appliance 30 additionally contains an interface 34 for connection to the control line 10. In the example, two interfaces 34 are again shown as alternatives in order to produce alternative connections to the bus system 12 and also alternatively to the conventional control line 14. The reproduction appliance 30 additionally contains a decoder 36 for receiving light instructions 18 from the control line 10 via the interface 34. Owing to the interface 34 and the ability to receive light instructions 18, the reproduction appliance 30 simulates a further luminaire L3 from the point of view of the lighting device 6. Since this is not an actual luminaire L, it is designated in inverted commas. All luminaires L1, 2 and the reproduction appliance 30 in the form of the simulated luminaire L3 therefore have different addresses 20, namely the numerals "1" to "3". The light instruction 18a thus differs from the light instructions 18b, c in that it contains the address 20 with the value "3" for addressing the luminaire L3, that is to say the reproduction appliance 30. The colour locus 22 additionally has the value "W" for white light in this case.

The structure of all the contents I is shown as an illustration of the content I2. Each of the contents I has an associated unique identifier 42 (in the example "1", "2" and "3"). As such, it is possible for the content to be addressed or identified uniquely by means of the identifier 42 or address. Additionally, the content then also contains the media that are actually to be reproduced. In the example of the content I2, this is a film 54.

The decoder 36 contains an association rule 38 associating control instructions 40 for the reproduction appliance 30 with light instructions 18. In this case, each control instruction 40 contains an identifier 42 and a command 44. The identifier 42 designates the respective addressed content I, and the command 44 how the applicable content I is to be handled. In the example, the control instruction 40a is associated with the light instruction 18a (address "3", white light "W", full luminous intensity "V"). The identifier 42 has the value "2" in this case, i.e. the control instruction 40 applies to the content I2. The command 44 has the value "S" for "Start the relevant content". According to the control instruction 40a, the content I2 is thus selected and reproduction of the content I2 is started. For the purpose of reproduction, the reproduction appliance 30 contains a projector 46 or alternatively, as shown in dashes, a display 48. Projector 46 and display 48 then produce a visual representation 50 of the visual content I2, which has thus been put in inverted commas in the FIGURE.

In the example, the content I1 is a picture 52, namely the representation of a cloudy sky, the content I2 is the film 54 in the form of a feature film, and the content I3 is a representation of the word "emergency exit" and a symbolically depicted arrow. When the content I3 is reproduced on the cabin interior surface of the passenger cabin 4 as intended, the arrow indicates one of the emergency exits.

Lighting device 6 and reproduction appliance 30 together form a reproduction structure 60 for the passenger cabin 4 for reproducing visual contents I in the latter.

During operation of the reproduction structure 60, the control unit 8 generates the light instructions 18a-c and puts them onto the control line 10a and thus transmits them to the luminaires L1, 2 and the reproduction appliance 30 in the form of the simulated luminaire L3. The luminaire L1 responds to the light instruction 18c by producing red light, luminaire L2 responds to the instruction 18b by producing green light, each at full brightness (indicated in inverted commas).

An imaginary (actual) luminaire L3 would produce white light at full brightness as a result of receiving the light instruction 18a. However, the light instruction 18a is translated into the control instruction 40a in the reproduction appliance 30 and thus the feature film (content I2) is reproduced on the cabin interior surface.

When the aircraft 2, which previously contained only the luminaires L1, 2, is retrofitted, the reproduction appliance 30 is installed and connected to the control line 10. In this case, the control unit 8 is reprogrammed such that the light instruction 18a is additionally programmed to address the simulated luminaire L3 and hence the reproduction appliance 30.

On the bus system 12, the light instruction 18 is a bus command; on the conventional control line 14, it is a discrete switching state.

The contents I available for reproduction in the memory 32 are stored in or introduced into the memory 32 in a storage period ZS. In FIG. 1, this is depicted symbolically by an arrow. The storage period ZS is in this case in a maintenance interval for the aircraft 2 when it is on the ground for maintenance work. In an operating period ZB, the reproduction appliance 30 is then controlled by means of light instructions 18. The operating period ZB is in this case the flying period of the aircraft 2, that is to say the whole period from the passengers boarding to alighting from a particular flight. In the operating period ZB, the actual luminaires L1, 2 are also controlled according to the light instructions 18.

LIST OF REFERENCE SIGNS

2 Aircraft
4 Passenger cabin
6 Lighting device
8 Control unit
10,10a,b Control line
12 Bus system
14 Control line (conventional)
16 Instruction set
18,18a-c Light instruction
20 Address
22 Colour locus
24 Brightness
30 Reproduction appliance
32 Memory
34 Interface
36 Decoder
38 Association rule
40 Control instruction
42 Identifier
44 Command
46 Projector
48 Display
50 Representation
52 Picture
54 Film
60 Reproduction structure
L,L1-3 Luminaire
I,I1-3 Content
ZS Storage period
ZB Operating period

What is claimed is:

1. A reproduction appliance for a passenger cabin of an aircraft, for reproducing visual contents in the passenger cabin, wherein the passenger cabin comprises a lighting device, wherein the lighting device has a plurality of luminaires and a luminaire control unit for the luminaires and a single luminaire control line connecting the inputs of the luminaires to an output of the luminaire control unit, wherein the luminaire control unit contains a set of light instructions for actuating the luminaires and, wherein the light instructions instruct the luminaires to deliver light having a particular light characteristic during operation,
wherein
the reproduction appliance contains a memory for the visual contents to be reproduced, an interface for connection of an input of the reproduction appliance to the luminaire control line, and
a decoder, being part of the reproduction appliance, for receiving light instructions via the interface,
wherein the decoder contains an association rule associating a control instruction for the reproduction appliance with at least one of the light instructions, and
wherein the at least one of the light instructions associated with the control instruction is a light instruction which is unoccupied or a light instruction which is allocated to different addresses.

2. The reproduction appliance according to claim 1, wherein at least one of the visual contents contains a picture and/or a film.

3. The reproduction appliance according to claim 1, wherein at least one of the control instructions relates to the selection and/or reproduction of at least one of the visual contents.

4. The reproduction appliance according to claim 3, wherein the control instruction is an on, off, start, stop, pause or visual content selection instruction.

5. The reproduction appliance according to claim 1, wherein each of the visual contents has an associated unique identifier, and at least one of the light instructions has an associated one of the identifiers as at least part of the control instruction on the basis of the association rule.

6. A reproduction structure for a passenger cabin of an aircraft, for reproducing visual contents in the passenger cabin, wherein the reproduction structure contains a reproduction appliance according to claim 1 and the lighting device for the passenger cabin.

7. The reproduction structure according to claim 6, wherein the light instruction is a bus command or a discrete switching state.

8. The reproduction structure according to claim 6, wherein the light instruction contains instructions for a brightness and/or a colour locus for light that is to be produced by the luminaires during operation.

9. The reproduction structure according to claim 6, wherein the light instruction contains an address of a destination for the light instruction and the reproduction appliance has a different address from the luminaires.

10. A method for operating a reproduction appliance according to claim 1 installed in an aircraft as intended, wherein the visual contents to be made available for a reproduction are stored in the memory in a storage period, the reproduction appliance is controlled in an operating period by means of light instructions intended for the reproduction appliance.

11. The method according to claim 10, wherein the storage period is outside and at least part of the operating period is inside a flying period of the aircraft.

12. The method according to claim 10, wherein the reproduction appliance is operated as part of a reproduction structure, wherein said reproduction structure contains said reproduction appliance and the lighting device for the passenger cabin, and wherein the luminaires are controlled in the operating period by means of light instructions intended for the luminaires.

13. The reproduction appliance of claim 1, further comprising at least one of an electronic display and a projector for reproducing the visual content.

* * * * *